United States Patent [19]

Giere

[11] Patent Number: 4,696,164
[45] Date of Patent: Sep. 29, 1987

[54] HYDROSTATIC TRANSAXLE AND LOCKING DIFFERENTIAL AND BRAKE THEREFOR

[75] Inventor: David W. Giere, Chaska, Minn.

[73] Assignee: Eaton Corporation, Cleveland, Ohio

[21] Appl. No.: 769,033

[22] Filed: Aug. 26, 1985

[51] Int. Cl.$^4$ ............................................. F16D 31/02
[52] U.S. Cl. .................................. 60/485; 74/665 T; 74/687; 180/308; 192/20; 192/35
[58] Field of Search ................ 60/485, 487; 180/308, 180/70.1; 74/665 F, 665 T, 687, 764, 765, 770, 710.5; 192/.098, 35, 36, 20

[56] References Cited

U.S. PATENT DOCUMENTS

| | | | |
|---|---|---|---|
| 2,424,942 | 7/1947 | Mynssen | 74/315 |
| 2,874,790 | 2/1959 | Hennessey | |
| 2,978,929 | 4/1961 | Roberts | 74/711 |
| 3,474,689 | 10/1969 | Young | 74/711 |
| 3,538,790 | 11/1970 | Polak | 74/687 X |
| 3,751,924 | 8/1973 | Brown et al. | 60/485 |
| 3,814,222 | 6/1974 | Koivunen | 74/710.5 X |
| 3,994,354 | 11/1976 | Haumaier | 74/710.5 X |
| 4,031,780 | 6/1977 | Dolan et al. | 192/35 X |

FOREIGN PATENT DOCUMENTS

| | | |
|---|---|---|
| 1816183 | 6/1970 | Fed. Rep. of Germany . |
| 1945439 | 3/1971 | Fed. Rep. of Germany . |
| 1487479 | 5/1967 | France . |
| 2478766 | 9/1981 | France . |
| 281033 | 5/1952 | Switzerland . |
| 287435 | 4/1953 | Switzerland . |
| 853197 | 11/1960 | United Kingdom . |

Primary Examiner—Edward K. Look
Attorney, Agent, or Firm—D. A. Rowe; L. J. Kasper

[57] ABSTRACT

A hydrostatic transaxle assembly T is disclosed including a pump (11), a manifold portion (13), and right and left motor axle assemblies (15 and 17). Each of the motor axle assemblies includes a radial ball motor (41), the output of which is the input to a gear reduction section (53). Each gear reduction section (53) includes primary and secondary planetary gear sets (55) and (57) including a planet carrier (79) driving the respective axle shaft. The transaxle assembly T includes a locking differential and parking brake mechanism (87) which comprises an engagement mechanism (89) and an actuation mechanism (91). When the engagement mechanism (89) is disengaged, the motor assemblies (15) and (17) are free to operate at different speeds for normal differentiation. The actuation mechanism (91) can be actuated to either a locking differential mode (FIG. 8) or a parking brake mode (FIG. 9). In the locking differential mode, both of the planet carriers (79) are free to turn, but must turn at the same speed of rotation. In the parking brake mode, both of the planet carriers (79) are prevented from rotating by the lock gears (93) and (101).

16 Claims, 9 Drawing Figures

HYDROSTATIC TRANSAXLE AND LOCKING DIFFERENTIAL AND BRAKE THEREFOR

BACKGROUND OF THE DISCLOSURE

The present invention relates to hydrostatic transaxle assemblies, and more particularly, to such assemblies which have the capability for the operator to select from among various operating modes.

Certain vehicles, such as lawn and garden tractors, have used hydrostatic transaxle assemblies for transmitting engine torque to a pair of ground-engaging drive wheels to propel the vehicle. A typical transaxle assembly which has been used commercially includes a variable displacement hydraulic pump, such that the ratio of pump output flow to pump input speed (engine speed) could be infinitely varied by the vehicle operator. This ability to infinitely vary the output-input ratio, without interrupting torque transmission, makes transaxle assemblies greatly preferred over conventional clutch and gear transmission arrangements for vehicles of the type referred to above.

Vehicles which utilize transaxle assemblies frequently encounter operating conditions in which one of the drive wheels has less traction than the other drive wheel. It has long been recognized by the manufacturers of such vehicles that it is desirable to provide the operator of the vehicle with some type of control arrangement for effectively dealing with such loss of traction situations. At the same time, however, it is recognized that under most operating conditions, the vehicle must be able to have "normal differentiation" between the two drive wheels, i.e., it must be possible for the two drive wheels to be driven at substantially different speeds, such as during a sharp turn.

In addition to dealing with the loss of traction situation, there are various other operating conditions which occur with such vehicles. For example, it is normally desirable for vehicles of this type to have some sort of parking brake to be applied only when the vehicle is at a standstill, and it is especially desirable to incorporate such a parking brake into the transaxle assembly to be used to propel such a vehicle.

PRIOR ART

Prior to the time of the present invention, the commercially used transaxle assemblies have included a hydrostatic transmission (HST) and a mechanical axle assembly. The HST would typically be a light-duty HST such as the Model 11 sold by Eaton Corporation and comprising a variable displacement, radial ball pump and a fixed displacement radial ball motor. The HST would transmit engine torque to the input of the mechanical axle assembly, which would include a spur and/or bevel gear reduction unit and a pair of output axles for connection to the drive wheels.

The mechanical axle assembly would typically include some sort of differential to permit normal differentiation between the left and right drive wheels. On such axle assemblies, it is known to provide an automotive-type limited slip or locking differential to prevent spinout of one drive wheel relative to the other during loss of traction situations. Although a transaxle assembly of the type described above has provided generally satisfactory performance, the excessive weight, size, and cost of such units make them commercially less desirable.

SUMMARY OF THE INVENTION

Accordingly, it is an object of the present invention to provide a hydrostatic transaxle assembly which overcomes the problems associated with the prior art transaxle and vehicle propel systems described above, and at the same time, includes the capability of dealing effectively with loss of traction situations.

It is a more specific object of the present invention to provide a hydrostatic transaxle assembly of the type which achieves the above-stated objects, while providing the operator with the capability of selecting between a normal differentiating mode of operation and a limited (or locked) differentiating mode of operation.

It is a further object of the present invention to provide a hydrostatic transaxle assembly which accomplishes the abovestated objects, and also provides a manually selectable parking brake.

The above and other objects of the present invention are accomplished by the provision of an improved hydrostatic transaxle assembly for use on a vehicle having a source of motive power, a fluid pump driven by said source of power, and a pair of driven wheels. The transaxle assembly comprises manifold means and first and second motor assemblies. The manifold means defines a fluid inlet adapted to be in fluid communication with the fluid outlet of the pump, and a fluid outlet adapted to be in fluid communication with the fluid inlet of the pump. The manifold means further defines first and second fluid passage means communicating between the fluid inlet and the fluid outlet of the manifold means and flowing through the first and second motor assemblies, respectively. Each of the first and second motor assemblies includes a rotary fluid pressure actuated device, and axle means operable to transmit the rotary output of the motor assembly to the respective driven wheel. Each of the first and second motor assemblies further includes a housing and a gear set operably disposed between the fluid pressure actuated device and the axle means to transmit the rotary output of the fluid pressure actuated device to the axle means. Each of the first and second motor assemblies includes a gear member having its axis of rotation fixed relative to the housing of the respective motor assembly, and having a speed of rotation which is representative of the speed of rotation of the respective motor assembly.

The improved transaxle assembly is characterized by interwheel differential means comprising first and second lock gear members in toothed-engagement with the gear members of the first and second motor assemblies, respectively. The differential further comprises engagement means operably associated with the first and second lock gear members, and actuation means operably associated with the engagement means and selectively operable to move the engagement means between two positions;

(i) in a first position of the engagement means the first and second lock gear members are free to rotate relative to each other, thus permitting normal differentiation between the first and second motor assemblies and the speeds of the driven wheels; and (ii) in a second position, the first and second lock gear members are fixed relative to each other, thus preventing the normal differentiation between the first and second motor assemblies and the speeds of the driven wheels.

In accordance with another aspect of the invention, the improved transaxle assembly is characterized by the engagement means and the actution means further comprising a braking mechanism operable to fix the first and second lock gear members relative to each other, and relative to the housing, thus preventing rotation of the first and second lock gear members and of the first and second axle means.

DESCRIPTION OF THE PREFERRED EMBODIMENT

Figure 1:
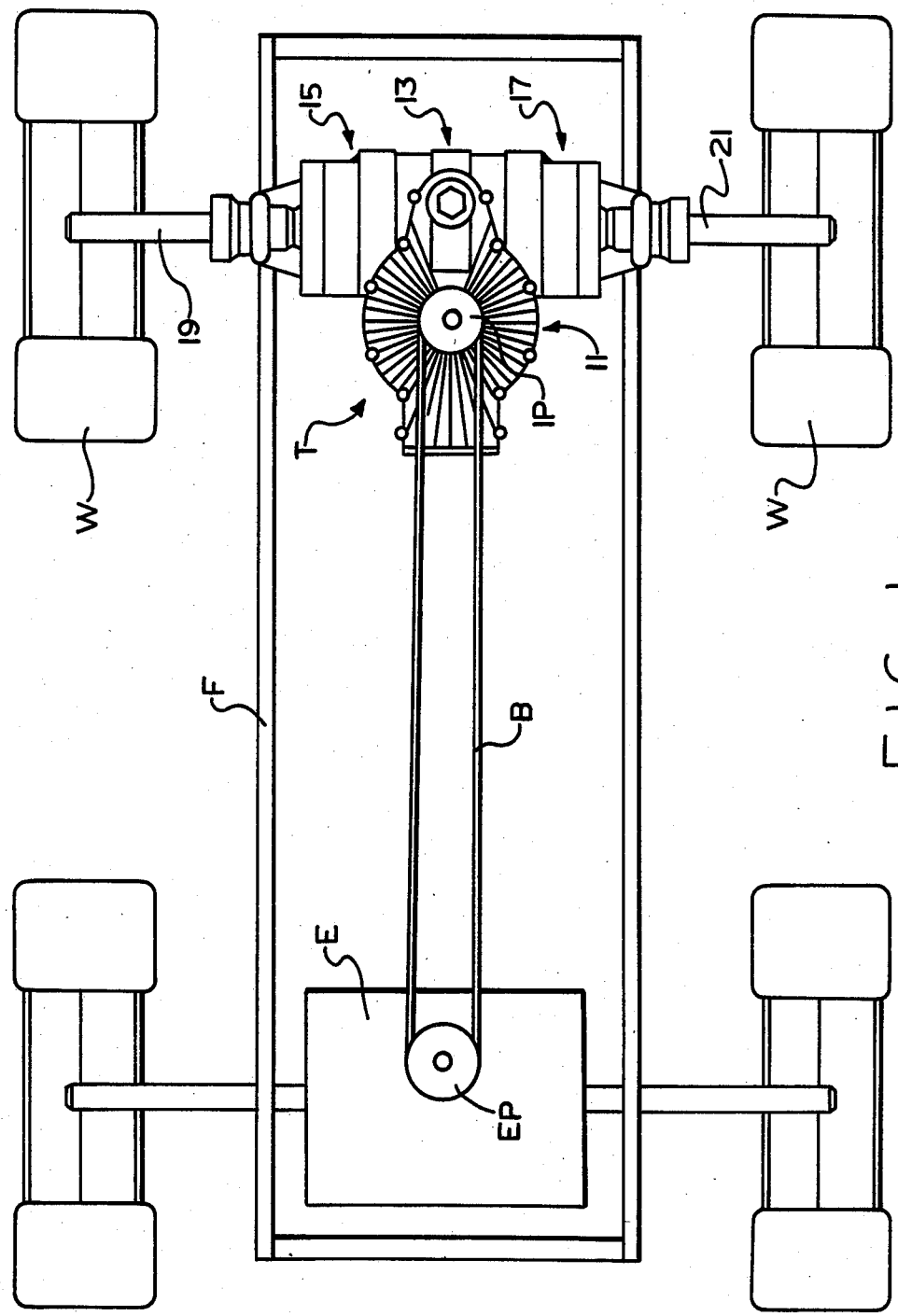
FIG. 1 is a somewhat schematic, top plan view of a vehicle such as a garden tractor equipped with a hydrostatic transaxle assembly of the type to which the present invention relates.

Referring now to the drawings, which are not intended to limit the invention, FIG. 1 is a top plan view showing the transaxle of the present invention, installed on a typical garden tractor. The tractor includes a vehicle frame F, which supports the vehicle engine E, disposed adjacent the front end of the vehicle and supported in a known manner. The tractor also includes a pair of ground-engaging drive wheels W which are adapted to be driven by the transaxle assembly, generally designated T.

The transaxle assembly T includes a variable displacement radial ball pump, generally designated 11, a central manifold portion 13, and right and left motor axle assemblies 15 and 17, respectively. Extending out of the right motor axle assembly 15 is a right axle shaft 19, and extending out the left motor axle assembly is a left axle shaft 21. As is well known in the art, the right and left axle shafts 19 and 21 extend into and are drivingly connected to the drive wheels W. Preferably, the drive wheels W comprise the sole source of propulsion for the vehicle shown in FIG. 1, and the transaxle assembly T comprises the sole source of propulsion for the drive wheels W.

Typically, the engine includes an engine driven pulley EP which transmits engine torque by means of a V-belt B to the input pulley IP, which in turn drives the input shaft of the variable pump 11.

Figure 2:
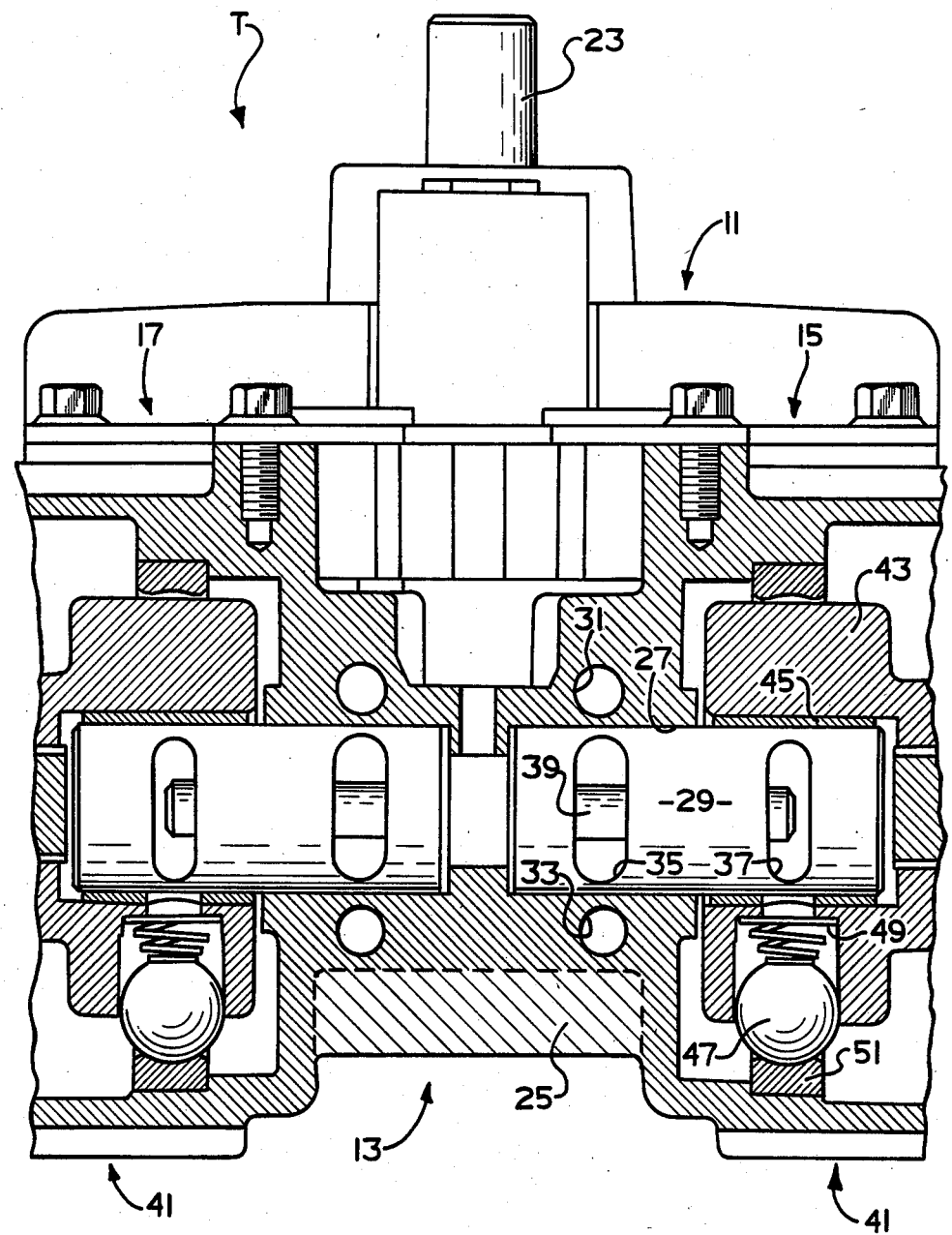
FIG. 2 is an axial cross section showing the central portion of a transaxle assembly made in accordance with the present invention.

Referring now to FIG. 2, there is illustrated in axial cross section the central portion of the transaxle assembly T. Disposed on top of the manifold portion 13 is the variable displacement radial ball pump 11 including an input shaft 23 which receives input torque by means of the input pulley IP (not shown in FIG. 2) as described in connection with FIG. 1. Because the pump 11 is of a type well known in the art, and not essential to the present invention, it will not be described further herein.

Although the transaxle assembly T was described, in connection with FIG. 1, as comprising a central manifold portion 13, and right and left motor axle assemblies 15 and 17, it should be noted in connection with FIG. 2 that the central manifold portion 13 comprises a manifold casting 25 which also surrounds the two motor elements, as will be described further hereinafter. Because the right and left motor axle assemblies 15 and 17 are substantially identical, only one will be described in detail, and that description will be understood to apply to the other as well.

Preferably, the motor axle assemblies 15 and 17 each include a relatively inexpensive high-speed, low-torque motor element which, in the subject embodiment, comprises a fixed displacement, radial ball motor, generally designated 41. In connection with each radial ball motor 41, the manifold casting 25 defines an axially-extending bore 27 in which is received a nonrotatable pintle assembly 29. The manifold casting 25 also defines an inlet passage 31 which receives pressurized fluid from the outlet of the pump 11, as well as an outlet passage 33 which communicates low-pressure exhaust fluid from the motor 41 back to the inlet of the pump 11.

As is well known to those skilled in the art of radial ball pumps and motors, the pintle 29 defines a slot-like fluid passage 35 which receives high-pressure fluid from the inlet passage 31, and communicates the high-pressure fluid to a motor timing slot 37 by means of an axially-extending bore 39.

On the opposite side of the pintle assembly 29 is another, similar arrangement of ports, passages, and timing slots which is able to communicate low-pressure, exhaust fluid from the motor 41 to the outlet passage 33.

The motor 41 includes a rotor 43 which is rotatably disposed about the pintle 29 by means of a journal sleeve 45. The rotor 43 defines a plurality of radial cylinders, and in each of the cylinders is a ball member 47 which is biased by a compression spring 49 into engagement with the inner surface of a race 51 which is pressed into place within a stepped opening in the manifold casting 25. The manner in which pressurized fluid is communicated through the timing slots 37 into each of the cylinders containing the balls 47, thus causing rotation of the rotor 43, is well known to those skilled in the art and will not be described further herein.

Figure 3:
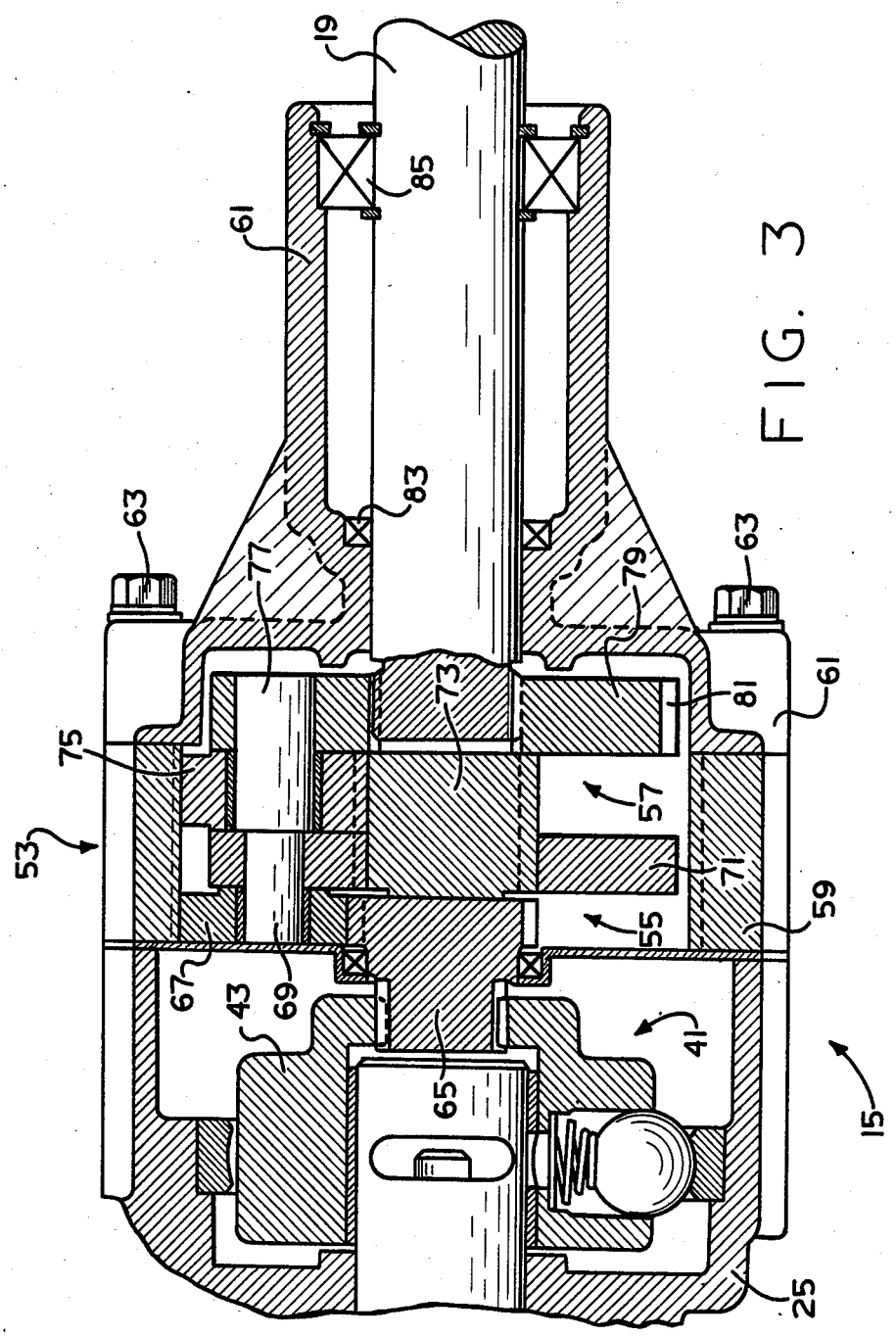
FIG. 3 is an axial cross section, axially foreshortened, and on the same scale as FIG. 2, showing the remainder of one end of the transaxle assembly of the invention.

Referring now to FIG. 3, each of the motor axle assemblies 15 and 17 also includes a gear reduction section, generally designated 53. The gear reduction section 53 includes primary and secondary planetary gear sets, generally designated 55 and 57, respectively. The gear reduction section 53 further includes a ring gear 59 which is fixed between the manifold casting 25 and an axle housing 61 by a plurality of bolts 63.

The primary planetary gear set 55 includes a sun gear 65 which is in splined engagement, at its left end in FIG. 3, with the rotor 43. The sun gear 65 is in toothed engagement with a plurality of planet pinion gears 67, which are also in toothed engagement with the ring gear 59, as is well known in the art. Each of the pinion gears 67 is jounaled for rotation on a pinion shaft 69 (only one of the pinion gears 67 and pinion shafts 69 being shown in FIG. 3). The pinion shafts 69 are received in a planet carrier 71 which is internally splined to a coupling member 73 which serves as both the output for the primary planetary set 55 and the input sun gear for the secondary planetary set 57.

In toothed engagement with the left end of the sun gear 73 is a plurality of planet pinion gears 75, which are also in toothed engagement with the ring gear 59. Each of the pinion gears 75 is journaled on a pinion shaft 77, with all of the pinion shafts 77 being received in a planet carrier 79. The planet carrier 79 differs from the carrier 71 in that it has both internal teeth, as well as a set of external teeth 81, the purpose of which will be described in connection with FIG. 4.

The internal teeth of the planet carrier 79 are in toothed engagement with the left end of the right axle shaft 19, which extends outwardly (to the right in FIG. 3) through the axle housing 61. Preferably, there is a lip seal disposed between the axle shaft 19 and the inner end of the housing 61, as well as a ball bearing set 85 disposed between the axle shaft 19 and the outer end of the housing 61.

Thus, as will be readily understood by those skilled in the art, the high-speed, low-torque output of the radial ball motor will be transmitted into a low-speed, high-torque output of the right axle shaft 19 by means of the primary and secondary planetary gear sets 55 and 57, respectively. It should be understood that, within the scope of the present invention, it is an essential feature only that the gear reduction section 53 includes some sort of speed reduction gearing, and the use of planetary gear sets, specifically, as well as the use of two reduction gear sets in series is by way of example only.

Figure 4:
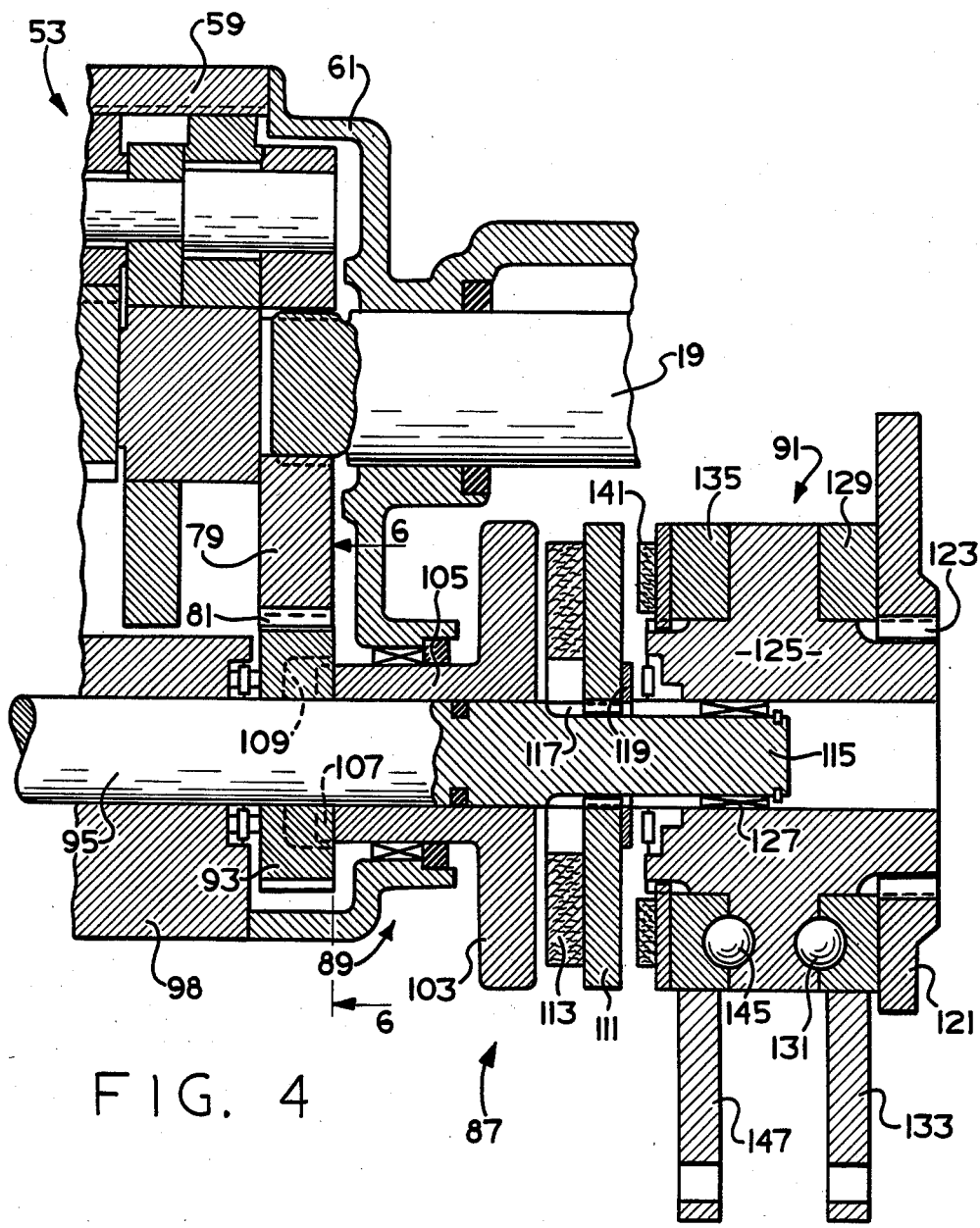
FIG. 4 is an axial cross section, similar to FIG. 3 and on the same scale, but taken on a different plane, illustrating the locking differential and parking brake mechanism made in accordance with the present invention.

Referring now to FIG. 4, in conjunction with FIG. 3, a portion of the locking differential and parking brake mechanism, generally designated 87, of the present invention will now be described. It should be noted that, although FIG. 4 is similar to FIG. 3 in illustrating the gear reduction section 53, FIG. 4 is taken on a different plane than FIG. 3. It should also be noted that in FIG. 4, for purposes of simplicity, not all of the housing surrounding the mechanism 87 has been shown.

The locking differential and parking brake mechanism 87 of the subject embodiment includes an engagement mechanism 89 and an actuation mechanism 91. The general purpose of the engagement mechanism 89 is to prevent relative rotation between the planet carrier 79 of the right motor axle assembly 15 and the planet carrier 79 of the left motor axle assembly 17. The general purpose of the actuation mechanism is simply to actuate the engagement mechanism 89. In the preferred embodiment of the present invention, the actuation mechanism 91 can provide either of two different engaged conditions of the engagement mechanism 89, one of which is the locking differential mode of operation, and the other of which is the parking brake mode of operation, both of which will be described in greater detail subsequently.

Referring now to FIG. 4, the external teeth 81 of the planet carrier 79 are in toothed engagement with the external teeth of a lock gear 93 which is mounted for rotation about an elongated locking shaft 95.

Figure 5:
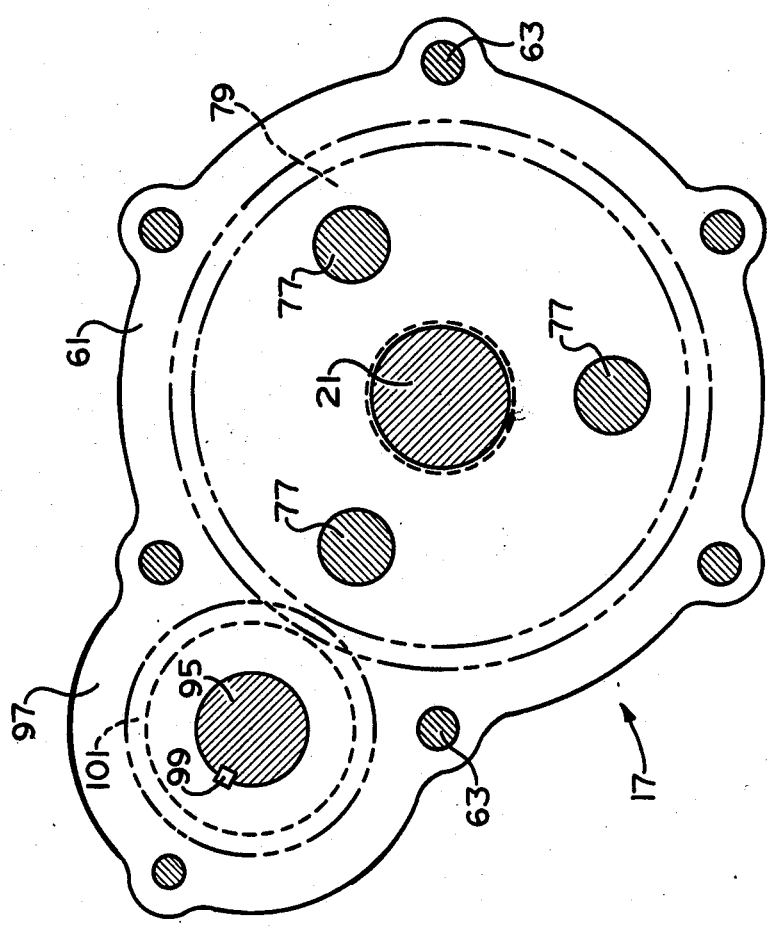
FIG. 5 is a transverse cross section, on the same scale as FIGS. 3 and 4, and taken through the planetary gear set of the lefthand motor assembly.

Referring now briefly to FIG. 5, there is a transverse cross section of a portion of the left motor axle assembly 17, there is illustrated the remainder of the engagement mechanism 89, i.e., the portion not shown in FIG. 4. It may be seen in FIG. 5 that the axle housing 61 of the left motor axle assembly 17 includes a shaft support portion 97 which receives and supports the end of the locking shaft 95. Mounted on the locking shaft 95, and fixed thereto by means of a key 99 is a lock gear 101 which is in toothed engagement with the planet carrier 79 of the left gear reduction section 53.

Figure 6:
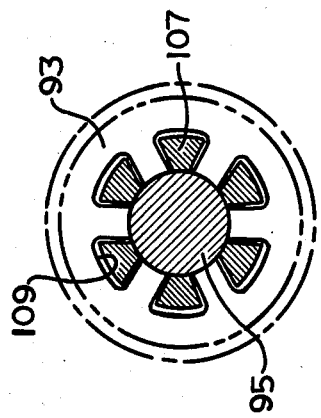
FIG. 6 is a transverse cross section taken on line 6—6 of FIG. 4, and on the same scale.

Referring again primarily to FIG. 4, the ring gear 59 and manifold casting 25 cooperate to define a shaft support portion 98, configured similar to the portion 97 in FIG. 5, such that the locking shaft 95 is supported and enclosed over its full axial extent from the mechanism 87 of FIG. 4 to the left axle housing 61 of FIG. 5. Also disposed about the locking shaft 95 is a clutch element 103 including a cylindrical hub portion 105 which terminates at its left end in FIG. 4 in a dog clutch 107 which is permanently disposed within a plurality of openings 109 defined by the lock gear 93, whereby the cluch element 103 and lock gear 93 rotate together (see FIG. 6). Disposed adjacent the clutch element 103 is a clutch element 111 on which is mounted a friction element 113. The right end of the locking shaft 95 has a reduced diameter portion 115 which includes a plurality of external splines 117, and the clutch element 111 is in splined engagement with the external splines 117, such that the clutch element 111 can move axially relative to the locking shaft 95 but cannot rotate relative thereto. The clutch element 111 also includes a thrust washer 119, the function of which will be described subsequently.

Figure 8:
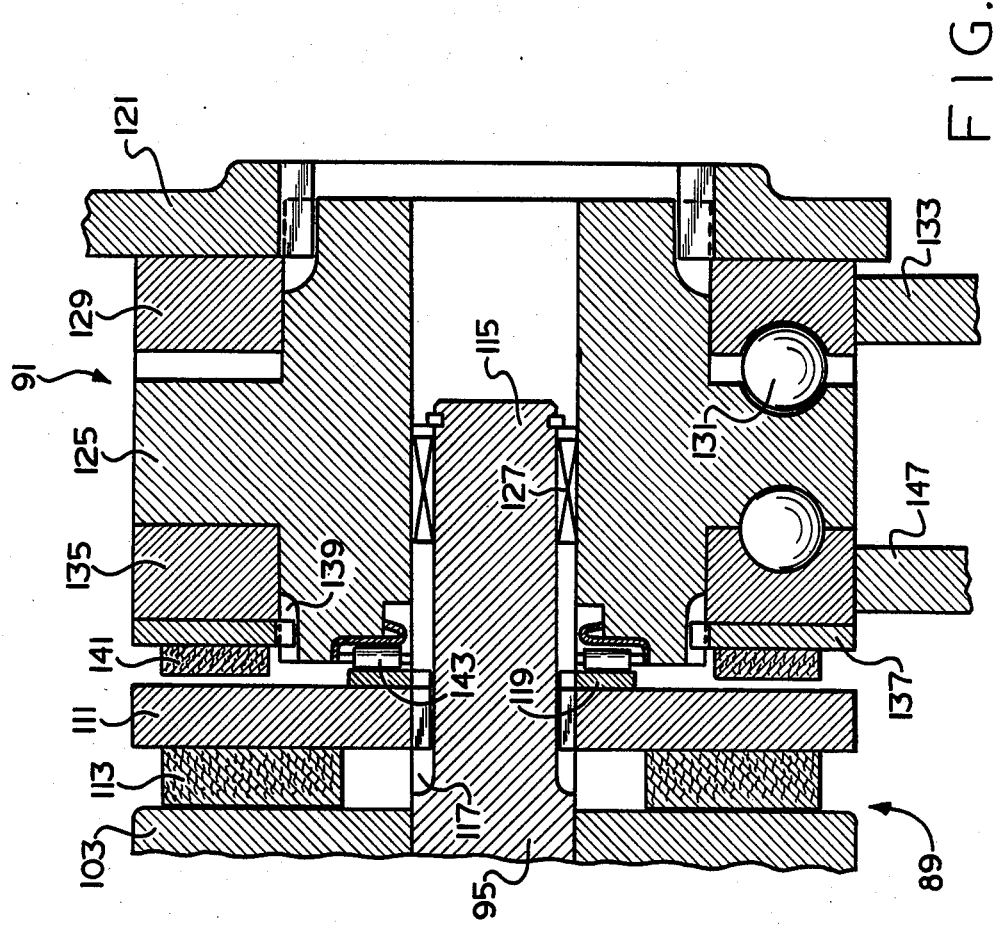
FIG. 8 is a fragmentary view, similar to FIG. 7 and on the same scale, illustrating the mechanism of the present invention in the locking differential mode.
Figure 7:
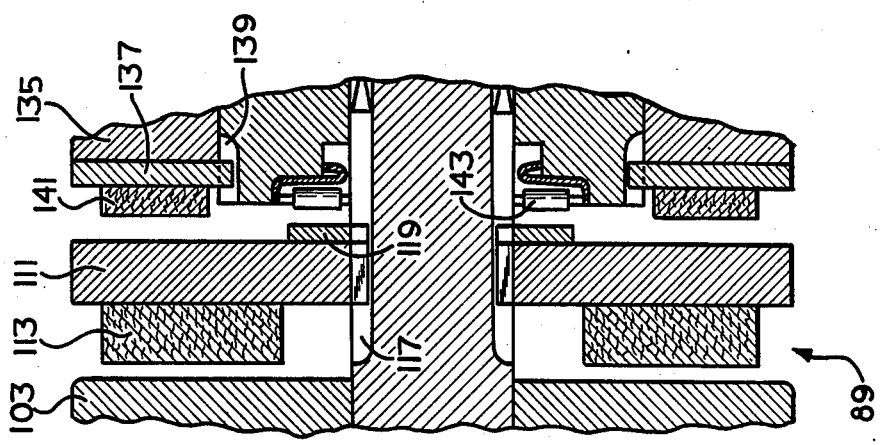
FIG. 7 is an enlarged, fragmentary view of a portion of the locking differential and parking brake mechanism of the present invention, in the normal differentiation mode.

Referring now to FIGS. 7 and 8, in conjunction with FIG. 4, the actuation mechanism 91 will be described. The actuation mechanism 91 is in the subject embodiment, a ball ramp cam actuator which can actuate the engagement mechanism 89 in either of two different ways. The mechanism 91 includes a cover plate 121 which is fixed relative to the axle housing 61 and includes a set of internal splines 123. In splined engagement with the cover plate 121 is an annular cam member 125 which, because of the splined connection to the cover plate 121 is able to move axially relative to the cover plate 121, but is prevented from rotation. The cam member 125 is supported relative to the reduced diameter portion 115 of the locking shaft 95 by means of a needle bearing set 127.

Disposed between the cam member 125 and the cover plate 121 is an annular cam ring 129, the member 125 and ring 129 cooperating to define mating ramp surfaces, between which are disposed a plurality of balls 131 (only one of which is shown in FIG. 4). The cam ring 129 may be manually rotated, relative to the cam member 125, by means of a handle 133.

Disposed about the left end (in FIG. 4) of the cam member 125, and able to rotate relative thereto, is an annular cam ring 135. Disposed to the left of the cam ring 135 is an annular splined disk 137 having its splines in engagement with a set of external splines 139 defined by the cam member 125. Attached to the splined disk 137 is a friction disk 141, and received in a recess disposed at the left end of the cam member 125 is a radial thrust bearing set 143, which is positioned for engagement with the thrust washer 119.

The cam member 125 and the cam ring 135 cooperate to define mating ramp surfaces, and disposed between the ramp surfaces is a plurality of cam balls 145 (only one of which is shown in FIG. 4). The cam ring 135 may be rotated, relative to the cam member 125, by means of a handle 147. It should be understood by those skilled in the art that some means other than the handles 133 and 147 may be used for rotating the cam rings 129 and 135. In addition, it may be desirable to have the handles (or other actuation means) biased to their unactuated position shown in FIG. 4.

NORMAL DIFFERENTIATION

Referring now primarily to FIG. 7 in conjunction with FIG. 4, operation of the transaxle assembly T in the normal differentiation mode will be described. With both of the handles 133 and 147 in the unactuated position of FIG. 4, the clutch element 111 and its friction element 113 are out of engagement with the clutch element 103, because no portion of the actuation mechanism 91 is in engagement with the clutch element 111. In this position of the engagement mechanism 89, the clutch element 103 and lock gear 93 are free to rotate relative to the locking shaft 95 and to the lock gear 101 associated with the planet carrier 79 of the left motor axle assembly 17. Thus, with the engagement mechanism 89 in the disengaged position of FIG. 7, the left and right motor axle assemblies 15 and 17 are free to operate at different output speeds, thus driving the right and left axle shafts 19 and 21 at different rotating speeds, such as during a sharp turn of the vehicle.

LOCKING DIFFERENTIAL MODE

Referring now primarily to FIG. 8 in conjunction with FIG. 4, the locking differential mode of operation will now be described. If the vehicle is operating under conditions in which there is likely to be a loss of traction of one wheel or the other, the operator can choose the locking differential mode of operation by displacing the handle 133, thus rotating the cam ring 129. Rotation of the cam ring 129 will cause the cam member 125 to "ramp up" on the cam balls 131, thus causing the cam member 125 to move axially to the left in FIG. 8. This leftward movement of the cam member 125 results in the thrust bearing set 145 engaging the thrust washer 119 on the clutch element 111, thus moving the element 111 and its friction element 113 into engagement with the clutch element 103. With the engagement mechanism 89 in the engaged condition illustrated in FIG. 8, the clutch element 103 and lock gear 93 are now fixed to rotate with the locking shaft 95 and left lock gear 101, because of the frictional engagement of elements 103 and 113 and the splined engagement of clutch element 111 to the splines 117. Thus, in the locking differential mode of FIG. 8, both of the planet carriers 79, which are in engagement with the lock gears 93 and 101, are free to rotate because the thrust washer 119 is in engagement with the bearing set 143, but the planet carriers 79 are locked together by the lock gears 93 and 101 and therefore, the right axle shafts 19 and 21 must rotate at the same speed.

PARKING BRAKE MODE

Figure 9:
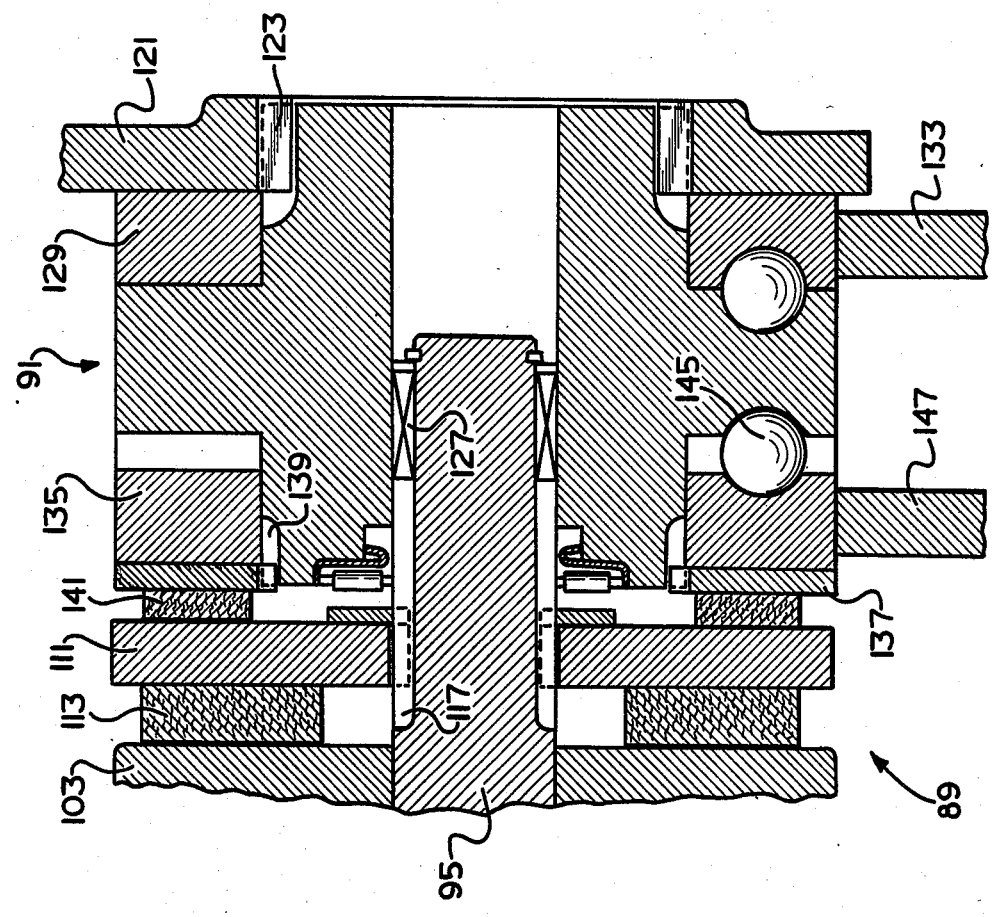
FIG. 9 is a fragmentary view, similar to FIGS. 7 and 8, and on the same scale, illustrating the mechanism of the present invention in the parking brake mode.

Referring now primarily to FIG. 9 in conjunction with FIG. 4, the parking brake mode of operation will be described. If the vehicle is operating on a slope, and the operator wishes to stop the vehicle and then apply a parking brake to prevent the vehicle from rolling on the slope, the operator can displace the handle 147 to rotate the cam ring 135. When the cam ring 135 is rotated, the cam member 125 does not move axially as during the locking differential mode of FIG. 8, but instead remains in the position shown in FIG. 4. When the cam ring 135 is rotated, it "ramps up" relative to the cam member 125 on the cam balls 145, thus moving the splined disk 137 and friction disk 145 into engagement with the clutch element 111. As in the case of the locking differential mode, the result is that the clutch element 111 and its friction element 113 are moved into frictional engagement with the clutch element 103. However, in the parking brake mode of FIG. 9, the result is that the clutch element 111 is engaged by the friction disk 141 on the spline disk 137, and because the spline disk 137 cannot rotate relative to the cam member 125 which in turn cannot rotate relative to the cover plate 121 and housing 61, the clutch elements 103 and 111 are in engagement, but are also prevented from rotating. Furthermore, because the shaft 95 is splined to the clutch element 111, the left lock gear 101 is prevented from rotating, as is the right lock gear 93.

Therefore, in the parking brake mode of operation, neither lock gear 93 or 101 can rotate and therefore neither of the planet carriers 79 can rotate, thus preventing the right and left axle shafts 19 and 21 from rotating.

The invention has been described in detail sufficient to enable one skilled in the art to make and use the same. It is believed that upon a reading and understanding of this specification, various alterations and modifications of the preferred embodiment will occur to those skilled in the art, and it is intended to include all such alterations and modifications within the scope of the invention, insofar as they come within the scope of the appended claims.

I claim:

1. A hydrostatic transaxle assembly for use on a vehicle having a source of motive power, a fluid pump driven by said source of power, and a pair of driven wheels; said transaxle assembly comprising manifold means and first and second motor assemblies; said manifold means defining a fluid inlet adapted to be in fluid communication with the fluid outlet of the pump, and a fluid outlet adapted to be in fluid communication with the fluid inlet of the pump, and fluid passage means communicating between said fluid inlet and said fluid outlet of said manifold means, and flowing through said first and second motor assemblies, respectively; each of said first and second motor assemblies including a rotary fluid pressure actuated device and axle means operable to transmit the rotary output of said motor assembly to the respective driven wheel; said fluid pump comprising the sole source of fluid input to both of said first and second motor assemblies; each of said first and second motor assemblies including a housing and a gear set operably disposed between said fluid pressure actuated device and said axle means to transmit the rotary output of said fluid pressure actuated device to said axle means; each of said first and second motor assemblies including a gear member having its axis of rotation fixed relative to said housing of the respective motor assembly and a speed of rotation representative of the speed of rotation of the respective motor assembly; characterized by:

(a) interwheel differential means comprising first and second lock gear members in toothed engagement with said gear members of said first and second motor assemblies, respectively;

(b) said differential means further comprising engagement means operably associated with said first and second lock gear members, and including a single clutch means operable to fix said first and second lock gear members relative to each other; and (c) actuation means operably associated with said engagement means and selectively operable to move said engagement means between:
  (i) a first position in which said first and second lock gear members are free to rotate relative to each other, thus permitting normal differentiation between said first and second motor assemblies and the speeds of the driven wheels; and
  (ii) a second position in which said first and second lock gear members are fixed relative to each other, thus preventing said normal differentiation between said first and second motor assemblies and the speeds of the driven wheels.

2. A hydrostatic transaxle assembly as claimed in claim 1 characterized by each of said rotary fluid pressure actuated devices comprising a high-speed, low-torque displacement mechanism, and each of said gear sets comprising a speed reduction gear set.

3. A hydrostatic transaxle assembly as claimed in claim 1 characterized by said engagement means and said actuation means further comprising a braking mechanism operable to fix said first and second lock gear members relative to each other and relative to said housing, thus preventing rotation of said first and second lock gear members and of said first and second axle means.

4. A hydrostatic transaxle assembly as claimed in claim 1 characterized by each of said gear sets comprising a planetary gear set including a sun gear driven by the rotary output of the respective fluid pressure actuated device, and a plurality of planet gears in operative, toothed engagement with said sun gear, to orbit thereabout, and in operative, toothed engagement with a ring gear defined by said housing.

5. A hydrostatic transaxle assembly as claimed in claim 4 characterized by each of said planet gears being mounted for rotation on a pinion shaft, each of said gear sets further including a carrier member fixedly receiving the respective pinion shafts, whereby said carrier member rotates at the orbit speed of said planet gears.

6. A hydrostatic transaxle assembly as claimed in claim 5 characterized by each of said carrier members including means for connecting said carrier member for driving engagement with the respective axle means, said carrier members comprising said gear members in toothed engagement with said first and second lock gear members.

7. A hydrostatic transaxle assembly for use on a vehicle having a source of motive power, a fluid pump driven by said source of power, and a pair of driven wheels; said transaxle assembly comprising housing means and first and second motor assemblies; each of said first and second motor assemblies including a rotary fluid pressure actuated device having a fluid inlet adapted to be in fluid communication with the fluid outlet of the pump, and a fluid outlet adapted to be in fluid communication with the fluid inlet of the pump; said fluid pump comprising the sole source of fluid input to both of said first and second motor assemblies; each of said first and second motor assemblies further including axle means operable to transmit the rotary output of said motor assembly to the respective driven wheel; each of said rotary fluid pressure actuated devices comprising a high-speed, low-torque displacement mechanism; each of said first and second motor assemblies including a reduction gear set operably disposed between said fluid pressure actuated device and said axle means to transmit the rotary output of said fluid pressure actuated device to said axle means; each of said reduction gear sets including an externally-toothed member having its axis of rotation fixed relative to said housing means, the speed of rotation of said externally-toothed member being representative of the speed of rotation of the respective motor assembly; characterized by:
  (a) interwheel differential means comprising first and second lock gear members in toothed engagement with said externally-toothed members of said first and second reduction gear sets, respectively;
  (b) said differential means further comprising engagement means operably associated with said first and second lock gear members, and including a single clutch means operable to fix said first and second lock gear members relative to each other; and
  (c) actuation means operably associated with said engagement means and selectively operable to move said engagement means between:
    (i) a first position in which said first and second lock gear members, and said first and second externally-toothed members are free to rotate relative to each other, thus permitting normal differentiation between said first and second motor assemblies and the speeds of the driven wheels; and
    (ii) a second position in which said first and second lock gear members and said first and second externally-toothed members are fixed relative to each other, thus preventing normal differentiation between said first and second motor assemblies and the speeds of the driven wheels.

8. A hydrostatic transaxle assembly for use on a vehicle having a source of motive power, a fluid pump driven by said source of power, and a pair of driven wheels; said transaxle assembly comprising manifold means and first and second motor assemblies; said manifold means defining a fluid inlet adapted to be in fluid communication with the fluid outlet of the pump, and a fluid outlet adapted to be in fluid communication with the fluid inlet of the pump, and fluid passage means communicating between said fluid inlet and said fluid outlet of said manifold means, and flowing through said first and second motor assemblies, respectively; said fluid pump comprising the sole source of fluid input to both of said first and second motor assemblies each of said first and second motor assemblies including a rotary fluid pressure actuated device and axle means operable to transmit the rotary output of said motor assembly to the respective driven wheel; each of said first and second motor assemblies including a housing and a gear set operably disposed between said fluid pressure actuated device and said axle means to transmit the rotary output of said fluid pressure actuated device to said axle means; each of said first and second motor assemblies including a gear member having its axis of rotation fixed relative to said housing of the respective motor assembly and a speed of rotation representative of the speed of rotation of the respective motor assembly; characterized by:
  (a) interwheel braking means comprising first and second lock gear members in toothed engagement with said gear members of said first and second motor assemblies, respectively;
  (b) said braking means further comprising engagement means operably associated with said first and second lock gear members, and including a single clutch means operable to fix said first and second lock gear members relative to each other; and (c) actuation means operably associated with said engagement means and selectively operable to move said engagement means between:
   (i) one position in which said first and second lock gear members are free to rotate relative to each other, thus permitting normal differentiation between said first and second motor assemblies and between the driven wheels, and normal differentiation between said motor assemblies and said housing; and
   (ii) another position in which said first and second lock gear members are fixed relative to each other, and relative to said housing, thus preventing said normal differentiation between said first and second motor assemblies, and braking said driven wheels.

9. A hydrostatic transaxle assembly for use on a vehicle having a source of motive power, a fluid pump driven by said source of power, and a pair of driven wheels; said transaxle assembly comprising manifold means and first and second motor assemblies; said manifold means defining a fluid inlet adapted to be in fluid communication with the fluid outlet of the pump, and a fluid outlet adapted to be in fluid communication with the fluid inlet of the pump, and fluid passage means communicating between said fluid inlet and said fluid outlet of said manifold means, and flowing through said first and second motor assemblies, respectively; each of said first and second motor assemblies including a rotary fluid pressure actuated device and axle means operable to transmit the rotary output of said motor assembly to the respective driven wheel; each of said first and second motor assemblies including a housing and a gear set operably disposed between said fluid pressure actuated device and said axle means to transmit the rotary output of said fluid pressure actuated device to said axle means; each of said first and second motor assemblies including a gear member having its axis of rotation fixed relative to said housing of the respective motor assembly and a speed of rotation representative of the speed of rotation of the respective motor assembly; characterized by:
   (a) interwheel differential means comprising first and second lock gear members in toothed engagement with said gear members of said first and second motor assemblies, respectively;
   (b) said differential means further comprising engagement means operably associated with said first and second lock gear members, and including an elongated shaft member fixed for common rotation with said second lock gear member and being disposed to rotate relative to said first lock gear member when said engagement means is in said first position; and
   (c) actuation means operably associated with said engagement means and selectively operable to move said engagement means between:
   (i) a first position in which said first and second lock gear members are free to rotate relative to each other, thus permitting normal differentiation between said first and second motor assemblies and the speeds of the driven wheels; and
   (ii) a second position in which said first and second lock gear members are fixed relative to each other, thus preventing said normal differentiation between said first and second motor assemblies and the speeds of the driven wheels.

10. A hydrostatic transaxle assembly as claimed in claim 9 characterized by said engagement means including clutch means operable in an actuated position to prevent relative rotation between said first lock gear member and said elongated shaft member, said actuated position of said clutch means comprising said second position of said engagement means.

11. A hydrostatic transaxle assembly as claimed in claim 10 characterized by said actuation means comprising a ramp cam actuator including a first axially movable cam means operable to move into engagement with said clutch means to achieve said actuated position of said clutch means, and in which said clutch means is free to rotate relative to said housing.

12. A hydrostatic transaxle assembly as claimed in claim 10 characterized by said actuation means comprising a ramp cam actuator including a second axially movable cam means operable to move into engagement with said clutch means to achieve said actuated position of said clutch means, and in which said clutch means is prevented from rotating relative to said housing, said second cam means comprising a braking mechanism operable to fix said first and second lock gear members relative to each other and relative to said housing.

13. A hydrostatic transaxle assembly for use on a vehicle having a source of motive power, a fluid pump driven by said source of power, and a pair of driven wheels; said transaxle assembly comprising manifold means and first and second motor assemblies; said manifold means defining a fluid inlet adapted to be in fluid communication with the fluid outlet of the pump, and a fluid outlet adapted to be in fluid communication with the fluid inlet of the pump, and fluid passage means communicating between said fluid inlet and said fluid outlet of said manifold means, and flowing through said first and second motor assemblies respectively; each of said first and second motor assemblies including a rotary fluid pressure actuated device and axle means operable to transmit the rotary output of said motor assembly to the respective driven wheel; each of said first and second motor assemblies including a housing and a gear set operably disposed between said fluid pressure actuated device and said axle means to transmit the rotary output of said fluid pressure actuated device to said axle means; each of said first and second motor assemblies including a gear member having its axis of rotation fixed relative to said housing of the respective motor assembly and a speed of rotation representative of the speed of rotation of the respective motor assembly; characterized by:
   (a) interwheel braking means comprising first and second lock gear members in toothed engagement with said gear members of said first and second motor assemblies, respectively;
   (b) said braking means further comprising engagement means operably associated with said first and second lock gear members, and including an elongated shaft member fixed for common rotation with said second lock gear member and being disposed to rotate relative to said first lock gear member when said engagement means is in said one position; and
   (c) actuation means operably associated with said engagement means and selectively operable to move said engagement means between:

(i) one position in which said first and second lock gear members are free to rotate relative to each other, thus permitting normal differentiation between said first and second motor assemblies and between the driven wheels, and normal differentiation between said motor assemblies and said housing; and (ii) another position in which said first and second lock gear members are fixed relative to each other, and relative to said housing, thus preventing said normal differentiation between said first and second motor assemblies, and braking said driven wheels.

14. A hydrostatic transaxle assembly as claimed in claim 13 characterized by said engagement means including clutch means operable in an actuated position to prevent relative rotation between said first lock gear member and said elongated shaft member, and between said elongated shaft member and said housing, said actuated position of said clutch means comprising said another position of said engagement means.

15. A hydrostatic transaxle assembly as claimed in claim 14 characterized by said actuation means comprising a ramp cam actuator including an axially movable cam means operable to move into engagement with said clutch means to achieve said actuated position of said clutch means, and in which said clutch means is prevented from rotating relative to said housing.

16. A hydrostatic transaxle assembly for use on vehicle having a source of motive power, fluid pump means driven by said source of power, and a pair of driven wheels; said transaxle assembly further including first and second motor assemblies; each of said motor assemblies defining a fluid inlet adapted to be in fluid communication with the fluid outlet of the pump means, and a fluid outlet adapted to be in fluid communication with the fluid inlet of the pump means, and fluid passage means communicating between said fluid inlet and said fluid outlet of said first and second motor assemblies; each of said first and second motor assemblies including a rotary fluid pressure actuated device and axle means operable to transmit the rotary output of said motor assembly to the respective driven wheel; each of said first and second motor assemblies including a housing and a gear set operably disposed between said fluid pressure actuated device and said axle means to transmit the rotary output of said fluid pressure actuated device to said axle means; each of said first and second motor assemblies including a gear member having its axis of rotation fixed relative to said housing of the respective motor assembly, and a speed of rotation representative of the speed of rotation of the respective motor assembly; characterized by:

(a) interwheel braking means comprising first and second lock gear members in toothed engagement with said gear members of said first and second motor assemblies, respectively;

(b) said braking means further comprising engagement means operably associated with said first and second lock gear members; and including an elongated shaft member fixed for common rotation with said second lock gear member and being disposed to rotate relative to said first lock gear member when said engagement means is in said one position; said engagement means further comprising a single clutch means operable to fix said first lock gear member relative to said elongated shaft member; and (c) actuation means operably associated with said engagement means and selectively operable to move said engagement means between:

(i) one position in which said first and second lock gear members are free to rotate relative to each other, thus permitting normal differentiation between said first and second motor assemblies and between the driven wheels, and normal differentiation between said motor assemblies and said housing; and (ii) another position in which said first and second lock gear members are fixed relative to each other, and relative to said housing, thus preventing said normal differentiation between said first and second motor assemblies, and braking said driven wheels.

* * * * *